(12) United States Patent
Foster et al.

(10) Patent No.: US 8,656,178 B2
(45) Date of Patent: Feb. 18, 2014

(54) METHOD, SYSTEM AND PROGRAM PRODUCT FOR MODIFYING CONTENT USAGE CONDITIONS DURING CONTENT DISTRIBUTION

(75) Inventors: Eric M. Foster, Owego, NY (US);
Jeffrey B. Lotspiech, San Jose, CA (US); Dalit Naor, Tel-Aviv (IL);
Sigfredo I. Nin, Morgan Hill, CA (US);
Florian Pestoni, Mountain View, CA (US); Wilfred E. Plouffe, Jr., San Jose, CA (US); Frank A. Schaffa, Hartsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 2393 days.

(21) Appl. No.: 10/125,714

(22) Filed: Apr. 18, 2002

(65) Prior Publication Data

US 2003/0198351 A1    Oct. 23, 2003

(51) Int. Cl.
*H04L 9/32*    (2006.01)
(52) U.S. Cl.
USPC .............. 713/181; 380/231; 380/277; 726/31
(58) Field of Classification Search
None
See application file for complete search history.

(56) References Cited

U.S. PATENT DOCUMENTS

| | | | |
|---|---|---|---|
| 5,117,458 A | 5/1992 | Takaragi et al. | |
| 5,345,549 A | 9/1994 | Appel et al. | 715/741 |
| 5,504,896 A | 4/1996 | Schell et al. | 725/131 |
| 5,765,152 A | 6/1998 | Erickson | |
| 5,784,460 A | 7/1998 | Blumenthal et al. | |
| 5,805,155 A | 9/1998 | Allibhoy et al. | 725/115 |
| 5,813,863 A | 9/1998 | Sloane et al. | 434/236 |
| 5,845,089 A | 12/1998 | Ohira et al. | 709/247 |
| 5,920,861 A | 7/1999 | Hall et al. | |
| 5,953,524 A | 9/1999 | Meng et al. | 717/108 |
| 5,956,482 A | 9/1999 | Agraharam et al. | 709/203 |
| 6,038,614 A | 3/2000 | Chan et al. | 710/1 |
| 6,046,750 A | 4/2000 | Fitzpatrick et al. | 345/440 |
| 6,073,122 A * | 6/2000 | Wool | 705/51 |
| 6,098,056 A | 8/2000 | Rusnak et al. | |
| 6,118,873 A | 9/2000 | Lotspiech et al. | 380/277 |
| 6,141,754 A | 10/2000 | Choy | |
| 6,236,971 B1 | 5/2001 | Stefik et al. | |
| 6,237,099 B1 | 5/2001 | Kurokawa | |
| 6,545,769 B2 | 4/2003 | Collard et al. | |
| 6,732,106 B2 | 5/2004 | Okamoto et al. | |
| 6,745,245 B1 * | 6/2004 | Carpenter | 709/229 |

(Continued)

OTHER PUBLICATIONS

Naor et al., IBM Response to DVB-CPT Call for Proposals for Content Protection & Copy Management: xCP Cluster Protocol. Published Oct. 19, 2001.*

(Continued)

*Primary Examiner* — Nadia Khoshnoodi
(74) *Attorney, Agent, or Firm* — Ian D. MacKinnon; Hoffman Warnick LLC

(57) ABSTRACT

The present invention provides a method, system and program product for modifying content usage conditions during broadcast content distribution. Specifically, the present invention allows protected (e.g., encrypted, secured, etc.) content to be received along with content usage conditions, an encrypted combination of the content usage conditions and a title key (e.g., a MAC), and a key management block. Using the key management block, a key encrypting key can be determined for decrypting the combination. Once the combination is decrypted, the content usage conditions can be modified (e.g., edited, added to, etc.).

24 Claims, 13 Drawing Sheets

(56) References Cited

U.S. PATENT DOCUMENTS

| | | | |
|---|---|---|---|
| 6,782,190 B1* | 8/2004 | Morito | 386/94 |
| 6,948,070 B1 | 9/2005 | Ginter et al. | |
| 7,227,952 B2* | 6/2007 | Qawami et al. | 380/201 |
| 7,260,721 B2* | 8/2007 | Tanaka et al. | 713/170 |
| 7,269,744 B1* | 9/2007 | Shippy et al. | 713/193 |
| 7,363,497 B1* | 4/2008 | Ferguson | 713/176 |
| 7,587,048 B2* | 9/2009 | Moriyama | 380/201 |
| 2001/0052077 A1 | 12/2001 | Fung et al. | |
| 2002/0003878 A1 | 1/2002 | Olson et al. | |
| 2002/0016775 A1* | 2/2002 | Nakagawa | 705/52 |
| 2002/0035516 A1 | 3/2002 | Arima | |
| 2002/0041686 A1* | 4/2002 | Moriyama et al. | 380/201 |
| 2002/0172362 A1* | 11/2002 | Wonfor et al. | 380/201 |
| 2002/0188854 A1 | 12/2002 | Heaven et al. | |
| 2003/0126086 A1* | 7/2003 | Safadi | 705/51 |
| 2004/0267671 A1* | 12/2004 | Nonaka et al. | 705/51 |
| 2005/0289076 A1* | 12/2005 | Lambert | 705/59 |

OTHER PUBLICATIONS

IBM Response to DVB-CPT Call for Proposals for Content Protection & Copy Management: xCP Cluster Protocol, Oct. 19, 2001, ftp://dvbftp:dvb2000@ftp.dvb.org/dvb-cpt/CfP/Responses/DVB-CPT-716.pdf.

"Content Protection System Architecture, A Comprehensive Framework for Content Protection," Intel Corporation, International Business Corporation, Matsushita Electric Industrial Co., Ltd., Toshiba Corporation, Feb. 17, 2000, Revision 0.81, http://www.4centity.com/data/tech/cpsa/cpsa081.pdf.

NDS Home Network, Home Network: NDS Helps Build the Digital Home, 1 page, Dated 2002, http://www.nds.com/solutions/home_networkprint.html.

NDS Video-on-Demand (Printable), "Video-on-Demand", 1 page, Dated 2002 http://www.nds.com/solutions/video_on_demandprint.html.

NDS VideoGuard (Printable), "NDS VideoGuard means security", 3 pp., Dated 2002 http://www.nds.com/solutions/videoguardprint.html.

Waveexpress.com, White Papers Understanding Technology, "Data Broadcasting to a Trusted Client", by Bhavan Shah, Marc Duvivier, 10 pp., Dated 2002, http://www.waveexpress.com/whitepapers1.html.

Cisco Systems, OCCAM: Open Conditional Content Access Management, "Response to the DVB Call for Proposals for Content Protection and Copy Management Technologies", 17 pp., Dated Oct. 19, 2001.

DVB-CPT-714, Smartright, Answer to the Call for Proposals for content protection & copy management technologies, Version 1.0, Dated Oct. 19, 2001, Submitted by: Thomson multimedia, Canal+ Technologies, Gemplus, Micronas, Schlumberger, STMicroelectronics.

Gelagay, Office Communication for U.S. Appl. No. 09/082,203 dated Jan. 26, 2005, 21 pages.

Gelagay, Office Communication for U.S. Appl. No. 09/082,203 dated Aug. 25, 2005, 25 pages.

Gelagay, Office Communication for U.S. Appl. No. 09/082,203 dated Mar. 3, 2006, 28 pages.

Gelagay, Office Communication for U.S. Appl. No. 09/082,203 dated Jun. 22, 2006, 32 pages.

* cited by examiner

METHOD, SYSTEM AND PROGRAM PRODUCT FOR MODIFYING CONTENT USAGE CONDITIONS DURING CONTENT DISTRIBUTION

CROSS-REFERENCE TO RELATED APPLICATION

This application is related to co-pending U.S. application Ser. No. 09/982,203, filed Oct. 18, 2001 and entitled "Method and System for Digital Rights Management in Content Distribution Applications."

BACKGROUND OF THE INVENTION

1. Field of the Invention

The present invention generally relates to a method, system and program product for modifying content usage conditions during broadcast (uni-directional) content distribution. More specifically, the present invention allows content usage conditions placed on digital content to be modified at various points during broadcast distribution of the digital content.

2. Background Art

As the use of digital technology becomes more pervasive, content such as television programming, music and movies are being increasingly delivered to consumers in digital format. One form of digital delivery is known as broadcast encryption whereby encrypted content can be received and decrypted without requiring two way communications between the recipient and the source. In particular, the encrypted content is transmitted from the source to the recipient with all information necessary to decrypt and utilize the content. This eliminates the need for follow-up communications from the recipient to the source. Conversely, many existing public distribution systems require two way communications (i.e., a "handshake"). However, in some applications, having a return channel for the handshake can be impossible, or at least very expensive.

A fundamental aspect of broadcast encryption schemes that enable one-way communication is the concept of a key management block (also referred to as a session key block or a media key block). The key management block allows compliant devices to calculate a cryptographic key using their internal device keys. At the same time, if a known circumvention device tries to perform the same calculation, it is misled by data in the key management block and will arrive at the wrong answer for the key.

One advantage of delivering content in a digital format, is the capability to impose usage conditions on the content. Specifically, the content can be packaged or "embedded" with usage conditions (e.g., copy controls) that help prevent the content from being illegally copied or otherwise exploited in its original form. Currently, many consumers can obtain content without making a legal purchase. This generally occurs when an individual obtains the content, and then reproduces it for distribution to third parties. In many of such cases, one copy of the content was legally purchased, but then abused by being reproduced and distributed without the requisite licensing fees being paid to a content owner (e.g., a movie studio) and/or a content service provider (e.g., a cable service provider). Accordingly, in an effort to limit losses, content owners have begun to "embed" various content usage conditions within the content.

Previously, if the content was to be encrypted or otherwise protected by the content owner, content usage conditions had to be defined at the origin of distribution. That is, the content usage conditions had to be defined and embedded prior to distribution of the encrypted content. To this extent, it was generally convenient for a content owner to produce a single piece of content and include the various usage conditions for all possible usage scenarios. For example, a movie might have usage conditions that specify, in a pay-per view application, "do not copy," whereas in a normal premium cable channel broadcast the usage conditions might state "copy once." However, it is difficult for a downstream device such as a video recorder to know which of the two situations applies. On the other hand, a content service provider would know which content usage conditions apply for a given instance. Accordingly, providing the content service provider with the capability to modify the content usage conditions would be very helpful as it could simply delete the irrelevant conditions. Moreover, modification of the content usage conditions can be valuable to a content service provider who may desire to limit distribution of content, which might not have been addressed by the content owner. In addition, with the growth of consumer home networks, it may be advantageous to provide end-users/consumers with the capability to modify content usage conditions, in a controlled way, within their respective home networks.

In view of the foregoing, there exists a need for a method, system and program product for modifying content usage conditions during one-way or broadcast content distribution. A further need exists for a content service provider and/or a consumer to be able to receive the content in a protected form, and modify the content usage conditions. Still yet, a need exists for a content service provider and/or a consumer to be able to modify content usage conditions according to an agreed-upon set of rules.

SUMMARY OF THE INVENTION

The present invention provides a method, system and program product for modifying content usage conditions during broadcast (i.e., uni-directional) content distribution. Specifically, under the present invention, content is encrypted with a title key (or otherwise protected) and transmitted with content usage conditions, a message authentication code (MAC) such as an encrypted combination of the title key and the content usage conditions, and a key management block. The recipient of the transmission will utilize the key management block to determine a key encrypting key, which is used to decrypt the encrypted combination. Once the combination has been decrypted, the recipient can modify/change (e.g., edit, delete from or add to) the content usage conditions. The recipient can also use the title key to decrypt and utilize the content. Moreover, the recipient can re-calculate the MAC (e.g., re-encrypt the combination with the key encrypting key), and then transmit the encrypted content, the re-encrypted combination, the modified usage conditions and the key management block to a further recipient in the distribution chain.

According to a first aspect of the present invention, a method for modifying content usage conditions during content distribution is provided. The method comprises the steps of: (1) receiving protected content, content usage conditions, a message authentication code (MAC) and a key management block (KMB); (2) processing the MAC with a key derived from the KMB; and (3) modifying the content usage conditions.

According to a second aspect of the present invention, a method for modifying content usage conditions during broadcast distribution is provided. The method comprises the steps of: (1) receiving encrypted content, content usage conditions, an encrypted combination of the content usage conditions and a title key, and a key management block (KMB); (2) determining a key encrypting key based on the KMB; (3) decrypting the encrypted combination using the key encrypting key; and (4) modifying the content usage conditions.

According to a third aspect of the present invention, a system for modifying content usage conditions during content distribution is provided. The system comprises: (1) a system for receiving encrypted content, content usage conditions, a message authentication code (MAC) and a key management block (KMB) from a content source; (2) a system for determining a key encrypting key based on the KMB; (3) a system for processing the MAC using the key encrypting key; and (4) a system for modifying the content usage conditions.

According to a fourth aspect of the present invention, a program product stored on a recordable medium for modifying content usage conditions during content distribution is provided. When executed, the program product comprises: (1) program code for receiving encrypted content, content usage conditions, an encrypted combination of the content usage conditions and a title key, and a key management block (KMB) from a content source; (2) program code for determining a key encrypting key based on the KMB; (3) program code for decrypting the encrypted combination using the key encrypting key; and (4) program code for modifying the content usage conditions.

According to a fifth aspect of the present invention, a method for encrypting a binding identifier during authorization of a new device in a consumer home network is provided. The method comprises the steps of: (1) authorizing a new device to join a consumer home network; and (2) transmitting an encrypted binding identifier to the new device, wherein the encrypted binding identifier is encrypted based on a peer key, and wherein the peer key is based on a media key that is determined from a key management block.

According to a sixth aspect of the present invention, a system for encrypting a binding identifier during authorization of a new device in a consumer home network is provided. The system comprises: (1) an authorization system for authorizing a new device to join a consumer home network; and (2) a transmission system for transmitting an encrypted binding identifier to the new device, wherein the encrypted binding identifier is encrypted based on a peer key, and wherein the peer key is based on a media key that is determined from a key management block.

According to a seventh aspect of the present invention, a method for accepting a proposed key management block (KMB) is provided. The method comprises the steps of: (1) proposing a KMB to an existing device; (2) authenticating the proposed KMB based on a key; and (3) accepting the proposed KMB if the proposed KMB includes an existing KMB. According to an eighth aspect of the present invention, a system for accepting a proposed key management block (KMB) is provided. The system comprises: (1) a system for proposing a KMB to an existing device; (2) a system for authenticating the proposed KMB based on a key; and (3) a system for accepting the proposed KMB if the proposed KMB includes an existing KMB.

According to a ninth aspect of the present invention, a method for merging two device clusters in a consumer home network is provided. The method comprises the steps of: (1) a device observing that a first device cluster is a subset of a second device cluster; and (2) the device abandoning the first device cluster.

According to a tenth aspect of the present invention, a system for merging two device clusters in a consumer home network is provided. The system comprises: (1) an observation system for a device to observe that a first device cluster is a subset of a second device cluster; and (2) an abandonment system for the device to abandon the first device cluster.

According to an eleventh aspect of the present invention, a local network of devices having network-accessible storage for exchanging encrypted content is provided. The local network comprises: (1) a key management block (KMB); and (2) a device authorization table, wherein content is encrypted with a key derived from the KMB and the authorization table.

Therefore, the present invention provides a method, system and program product for modifying content usage conditions during content distribution.

BRIEF DESCRIPTION OF THE DRAWINGS

These and other features of this invention will be more readily understood from the following detailed description of the various aspects of the invention taken in conjunction with the accompanying drawings in which.

Figure 1:
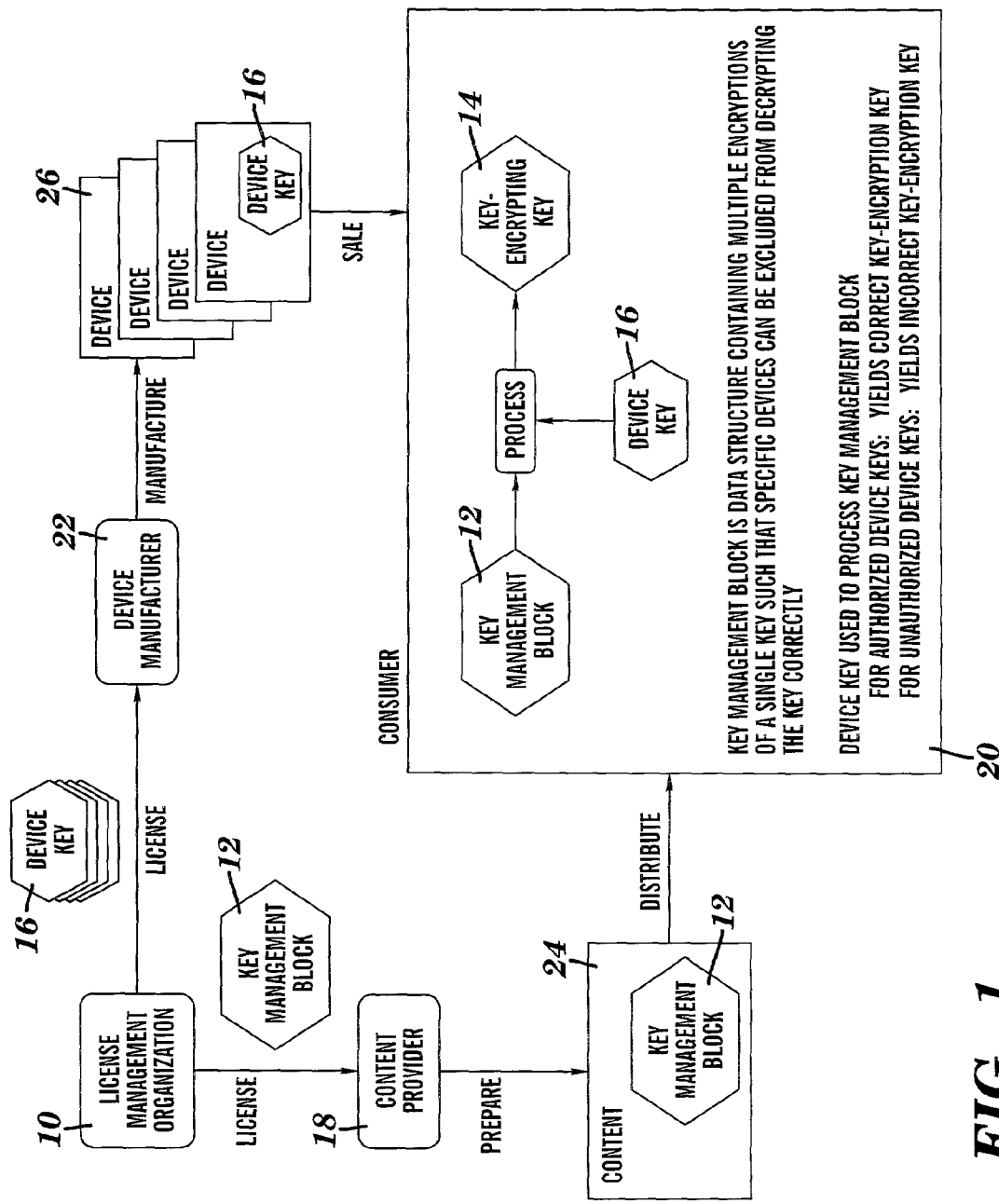
FIG. 1 depicts a flow diagram showing delivery of a key management block (KMB).

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For clarity, the Detailed Description of the Invention will have the following sections:

I. Definitions; and
II. Detailed Description.

I. Definitions

As used herein, the following terms shall have the following definitions:

Content—any data deliverable from a source to a recipient. Examples of content include, among other things, video and audio data.

Content Owner—an entity, such as a cable television network, that owns content.

Content Service Provider—an entity, such as a cable service provider, that provides the "pipeline" through which content is delivered from a content owner to a consumer.

Consumer Home Network—a series of interconnected consumer devices implemented under the xCP cluster protocol that allows the interconnected devices to share content.

Receiver—a consumer device, such as a set-top box, a DVD player, etc., that receives content directly from a content owner, from a content service or from another receiver within a consumer home network.

Recipient—any entity, such as a content service provider or a receiver, capable of receiving transmissions under the present invention.

Source—any entity, such as a content owner, a content service provider or a receiver (in a consumer home network), capable of sending transmissions under the present invention Title Key—a key used to encrypt content.

Content Usage Conditions—guidelines such as copy controls, etc., governing the use and/or exploitation of content.

Key Encrypting Key—a key that is used to encrypt a title key—content usage condition combination.

Key Management Block (KMB)—a data structure containing multiple encryptions of a key encrypting key. A KMB is also referred to in the art as a session key block, a media key block, a key media block and/or a management key block.

Device Key—a key assigned to a consumer device that is used to recover a key encrypting key from a KMB.

II. Detailed Description

In general, the present invention provides a way for encrypted or protected digital content to be received, and content usage conditions pertaining thereto to be modified during broadcast (i.e., uni-directional) distribution. Specifically, the present invention provides a method, system and program product for modifying content usage conditions placed on protected digital content without requiring two-way communication between the recipient and the source. To this extent, it should be understood that the present invention is intended to apply to: (1) transmissions from a content owner to a content service provider (e.g., digital cable television transmissions); (2) transmissions from a content owner to a receiver (e.g., digital content on a recordable medium such as a DVD); and (3) transmission from a content service provider to a receiver (e.g., digital cable television transmissions).

Referring now to FIG. 1, a flow diagram showing delivery of a key management block (KMB) 12 is depicted. As shown, an independent entity such as license management organization 10 develops KMB 12. As indicated above, KMB 12 is a data structure that includes multiple encryptions of key encrypting key 14 and excludes non-compliant devices. Device keys 16 are in used conjunction with KMB 12 to determine key encrypting key 14, which is used to encrypt/decrypt a title key and content usage conditions (as will be further described in detail below). Specifically, once developed by license management organization 10, KMB 12 is distributed to content owner/provider 18, who will prepare and encrypt content 24 with a title key. The title key will then be encrypted with key encrypting key 14. Content owner 18 will then deliver the encrypted content 24 to consumer 20 (or to content a service provider who will deliver the same to consumer 20) along with KMB 12. License management organization 10 also delivers valid device keys 16 to device manufacturer 22 who will then deliver (i.e., sell) compliant devices 26 containing the valid device keys 16 to consumer 20. Consumer 20 can then use device key 16 in their purchased device 26 to interpret KMB 12 to recover key encrypting key 14, which will be used to decrypt the title key. If the device key used by consumer 20 is not authentic or was revoked in KMB 12, the correct key encrypting key 12 will not be recovered. A non-compliant device is one that has been identified as a circumvention or revoked device that would allow content to be illegally or improperly exploited. Thus, KMB 12 and device keys 16 help prevent content from being misused.

Figure 2:
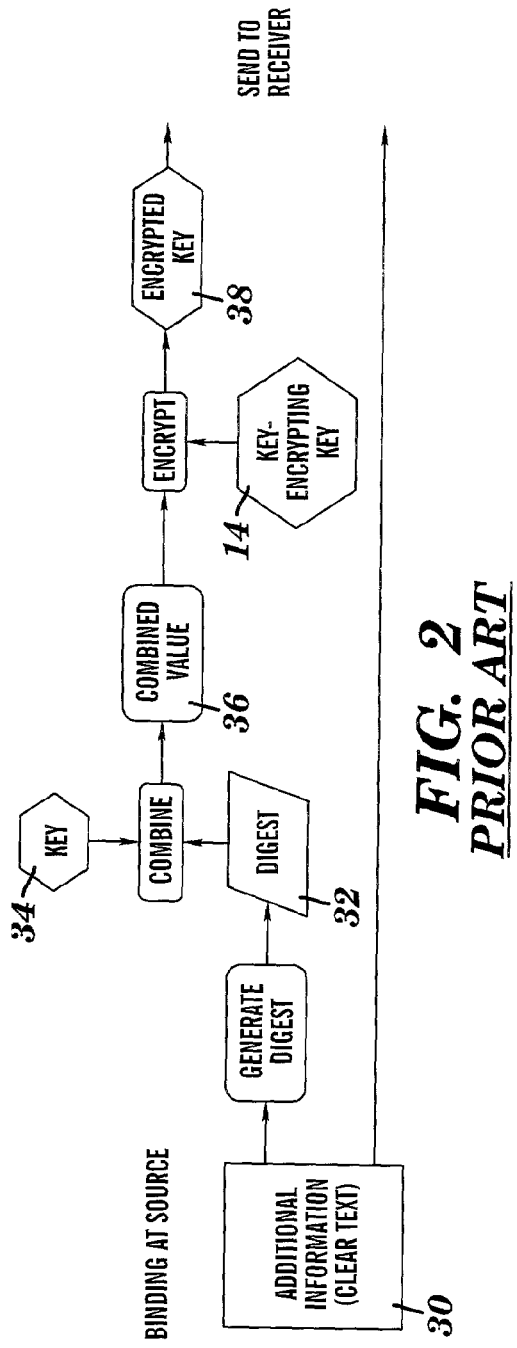
FIG. 2 depicts a flow diagram of content usage conditions being combined with a title key and encrypted with a key encrypting key.

Referring to FIG. 2, a flow diagram depicting the binding of content usage conditions 30 to title key 34 is shown. Key encrypting key 14 is used to encrypt/decrypt title key 34 and content usage conditions 30. Title key 34 is used to encrypt/decrypt content 24 (FIG. 1) itself. As depicted, content usage conditions 30 are provided by a content source such as content owner 18. The conditions 30 are then compressed into a digest 32 (e.g., a hash), which is combined with title key 34 (e.g., via an exclusive OR operation) to yield a combination 36. The resulting combination 36 is then encrypted with key encrypting key 14 to yield an encrypted combination 38. Once encrypted, the combination can then be transmitted to a recipient along with unencrypted content usage conditions 30. It should be understood that the encrypted combination 38 is considered to be a message authentication code (MAC). However, it should be further understood that many variations of MACs are known, and could be implemented under the present invention. For example, the MAC could be digest 32 as encrypted with key encrypting key 36 (e.g., without title key 34).

Figure 3:
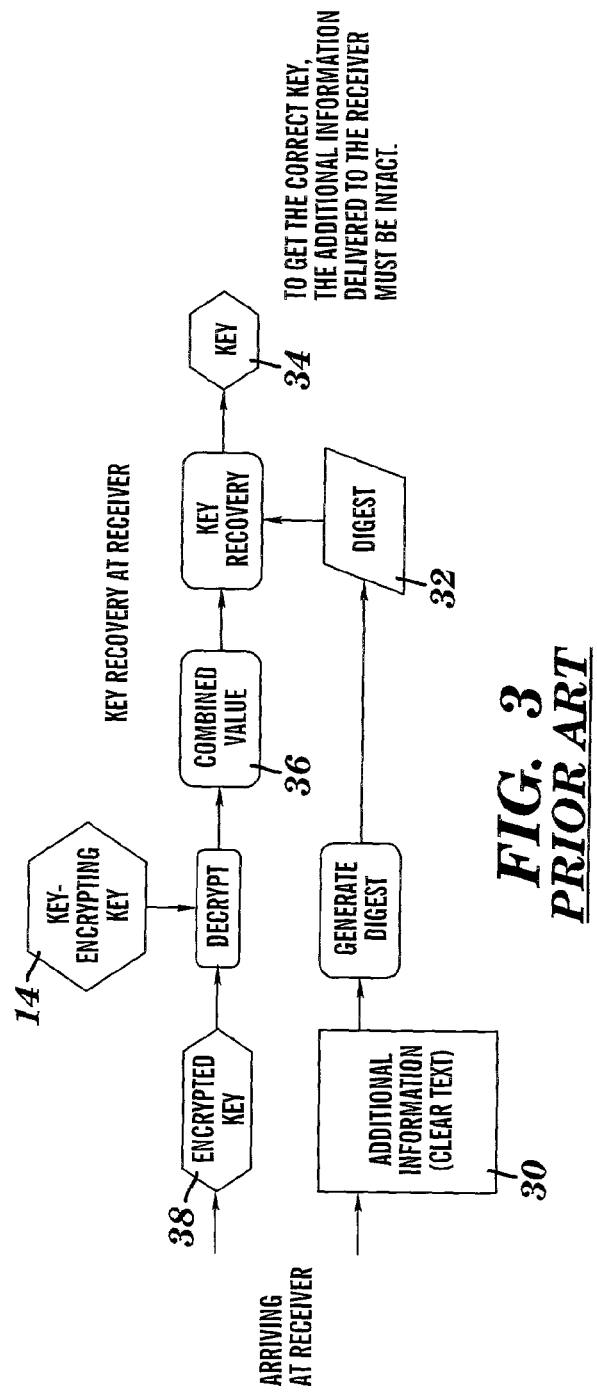
FIG. 3 depicts a flow diagram of the title key of FIG. 2 being recovered by a recipient.

FIG. 3 depicts the transmission of FIG. 2 after receipt by a recipient (e.g., content service provider or consumer). As shown, the recipient receives the encrypted combination 38 (i.e., the MAC) and content usage conditions 30 from the source. By processing KMB 12 of FIG. 1 with device keys 16, key encrypting key 14 is recovered (assuming device keys 16 are valid and do not pertain to a non-compliant device). Once key encrypting key 14 has been determined, encrypted combination 38 can be decrypted. Then, using the received content usage conditions 30, digest 32 is re-created and title key 34 is recovered. Specifically, once the digest is re-created, digest 32 will be "removed" (e.g., via an inverse exclusive OR operation) from combination 36 to yield title key 34. Once recovered, title key 34 is used to decrypt content. Thus, a recipient can receive and decrypt protected content and a digest of the usage conditions without having to hold two-way communications with the sender.

Figure 4:
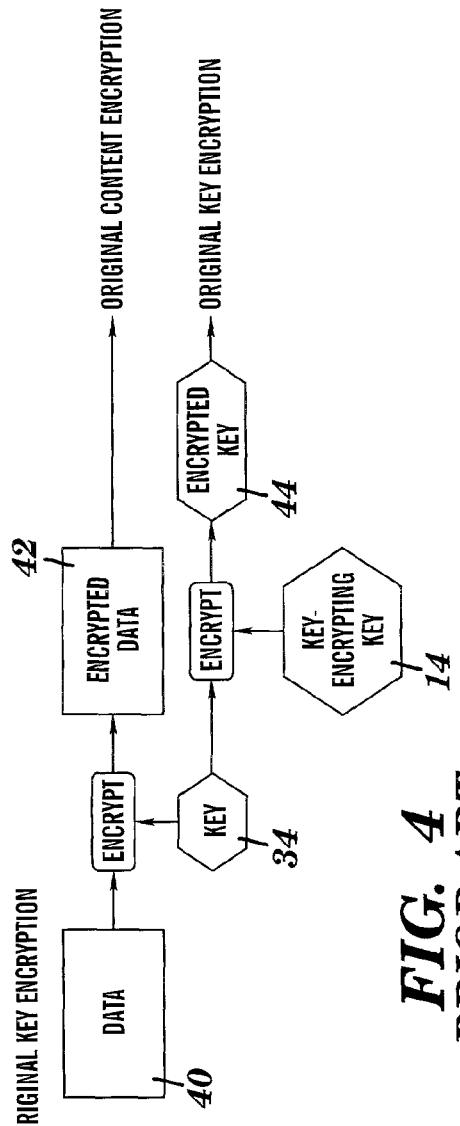
FIG. 4 depicts a flow diagram of a title key being encrypted with a key encrypting key.

Referring to FIG. 4, the encryption of content 40 using title key 34 is depicted in greater detail. As shown, content 40 is encrypted with title key 34 to yield encrypted content 42. Then, title key 34 is itself encrypted with key encrypting key 14. Although not shown in FIG. 4, title key 34 can be combined with content usage conditions prior to encryption. The encrypted title key 44 can then be transmitted along with the encrypted content 42 to a recipient.

Figure 5:
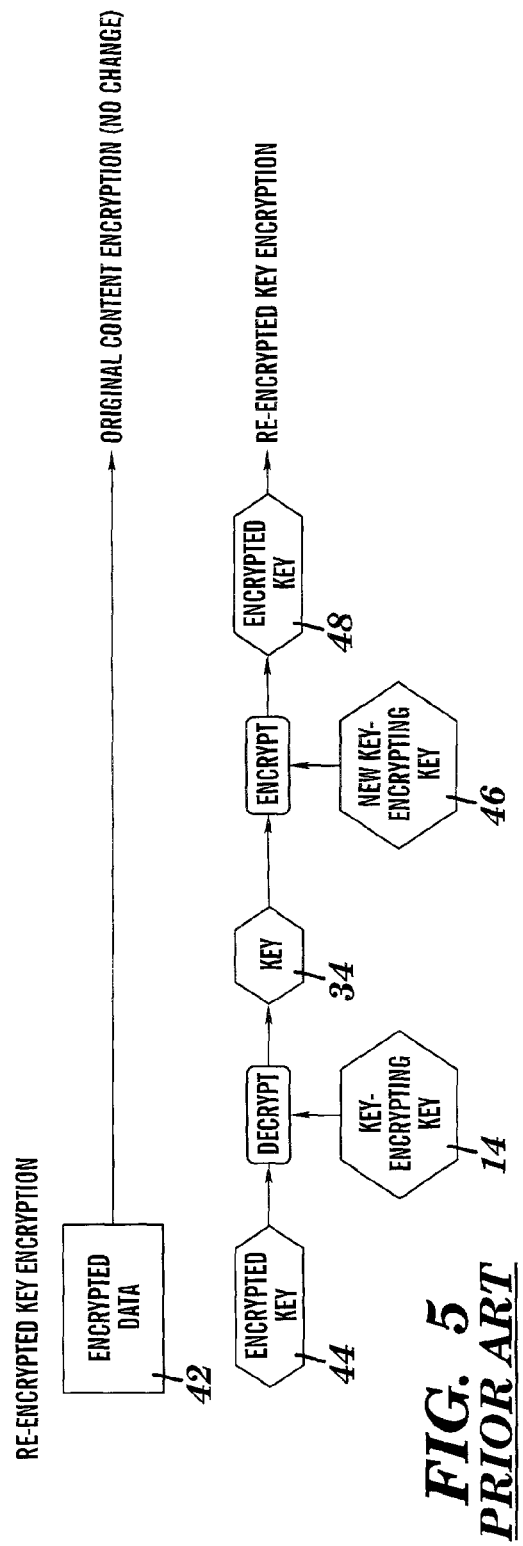
FIG. 5 depicts a flow diagram of the title key of FIG. 4 being decrypted and re-encrypted with a different key encrypting key.

FIG. 5 demonstrates that an encrypted title key 44 can be re-encrypted with a different key encrypting key 46 without having to re-encrypt the encrypted content 42. As shown, encrypted key 44 is received and decrypted with key encrypting key 14. Title key 34 is then re-encrypted with a new key encrypting key 46. The re-encrypted title key 48 is then transmitted along with the undisturbed encrypted content 42.

Under the present invention, protected content can be received by a recipient, and any content usage conditions pertaining thereto can be modified/changed (e.g., edited, added to, etc.). Specifically, a content owner can transmit protected content (with or without content usage conditions attached thereto) to a content service provider or a receiver who can verify and change/modify content usage conditions. Previously, it was not possible for a recipient to receive protected content and define or modify content usage conditions. For the purposes of the present invention, the changing or modification of content usage conditions is intended to apply to the creation of new content usage conditions, and/or the editing of existing content usage conditions.

Figure 6:
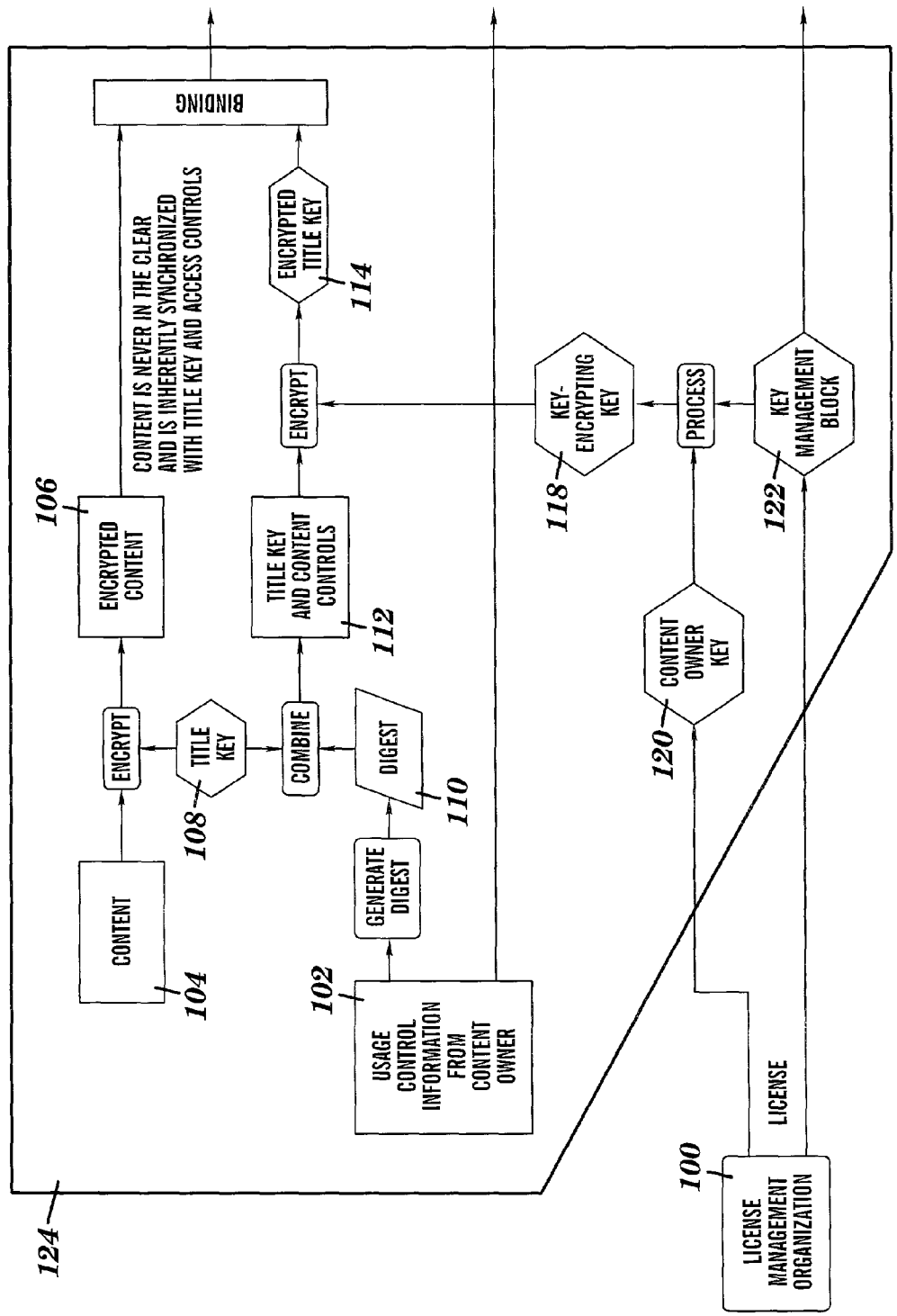
FIG. 6 depicts a flow diagram of a content owner encrypting content and defining usage conditions for the encrypted content, according to the present invention.

Referring to FIG. 6, the encryption and transmission of content and content usage conditions by a content owner 124 under the present invention is shown in greater detail.

As depicted, content owner 124 can provide owner content usage conditions 102 and content 104. Content 104 will be encrypted with title key 108 to yield encrypted content 106. Owner content usage conditions 102 can be any controls placed on content 104 such as copy controls. Once established, owner content usage conditions 102 will be compressed into a digest 110, which will be combined with title key 108 to yield combination 112. License management organization 100 will provide content owner 124 with content owner key 120 and KMB 122, which will be processed by content owner 124 to yield key encrypting key 118. As indicated above, KMB 122 includes, among other things, multiple encryptions of key encrypting key 118. Similar to device keys, content owner key 120 allows key encrypting key 118 to be recovered from KMB 122.

Once key encrypting key 118 is recovered, it will be used to encrypt the title key-content usage conditions (i.e., digest) combination 112 to yield encrypted combination 114. As indicated above, encrypted combination 114 is a type of a MAC. However, it should be understood that many variations of a MAC are known and could be implemented under the present invention. Encrypted content 106 will then be bound to encrypted combination 114 and transmitted to a recipient along with (unencrypted) owner content usage conditions 102 and KMB 122. Accordingly, a recipient will receive encrypted combination 114, encrypted content 106, owner content usage conditions 102 and KMB 122 in a single data delivery.

Figure 7:
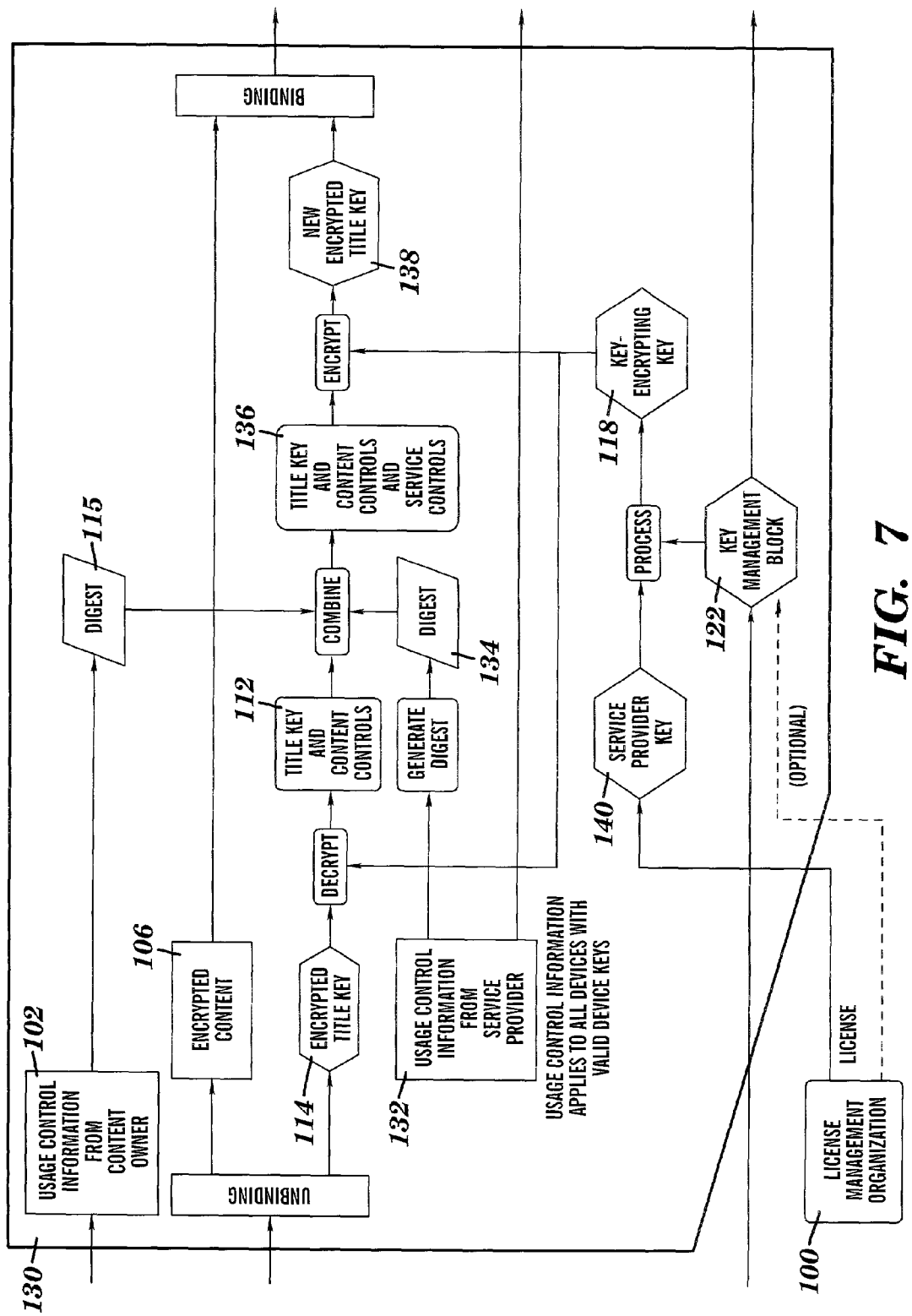
FIG. 7 depicts a flow diagram of a service provider receiving the transmission of FIG. 6 from the content owner, and modifying the content usage conditions therein.

Referring now to FIG. 7, a content service provider 130 recipient is shown in greater detail. Specifically, FIG. 7 depicts content service provider 130 receiving the transmission of FIG. 6 from content owner 124. As shown, content service provider 130 will separate encrypted content 106 from encrypted combination 114. Then, using key encrypting key recovered 118 from KMB 122 with service provider key 140 (as provided by license management organization 100), content service provider 130 will decrypt encrypted combination 114 (i.e., the MAC). Content service provider 130 can then verify the integrity of and/or modify the content usage conditions. In the case of the former, content service provider 130 can verify the integrity of owner content usage conditions 102 by comparing the content usage conditions as digested (110) in decrypted combination 114 with verification digest 115 that is created based on owner content usage conditions 102.

In modifying content usage conditions, content service provider 130 can add new service provider content usage conditions 132, or edit the existing owner content usage conditions present in decrypted combination 112. In any event, the MAC will be recalculated. That is, the new and/or edited content usage conditions will be compressed into a digest 134 and combined (e.g., via an XOR operation) with the title key and any existing (e.g., unedited) content usage conditions digest. The resulting combination 136 is then re-encrypted via key encrypting key 118 to yield new encrypted combination 138. Similar to owner content usage conditions 102, service provider content usage conditions 132 can be any control placed on content 104. One example is the preventing of rebroadcast of content 104 by a receiver.

Once new combination 136 is formed, key encrypting key 118 will be used to form re-encrypted combination 138, which will be bound to encrypted content 106. The bound elements will then be transmitted to a receiver along with the original content usage conditions 102, service provider content usage conditions 132 and KMB 122 in a single data delivery. Accordingly, as FIG. 7 demonstrates, the present invention provides the capability to receive encrypted or otherwise protected content, and modify content usage conditions pertaining thereto. It should be understood that although KMB 122 was described as being delivered from content owner 124 to content service provider 130, KMB 122 could optionally be provided to content service provider 130 by license management organization 100.

Figure 8:
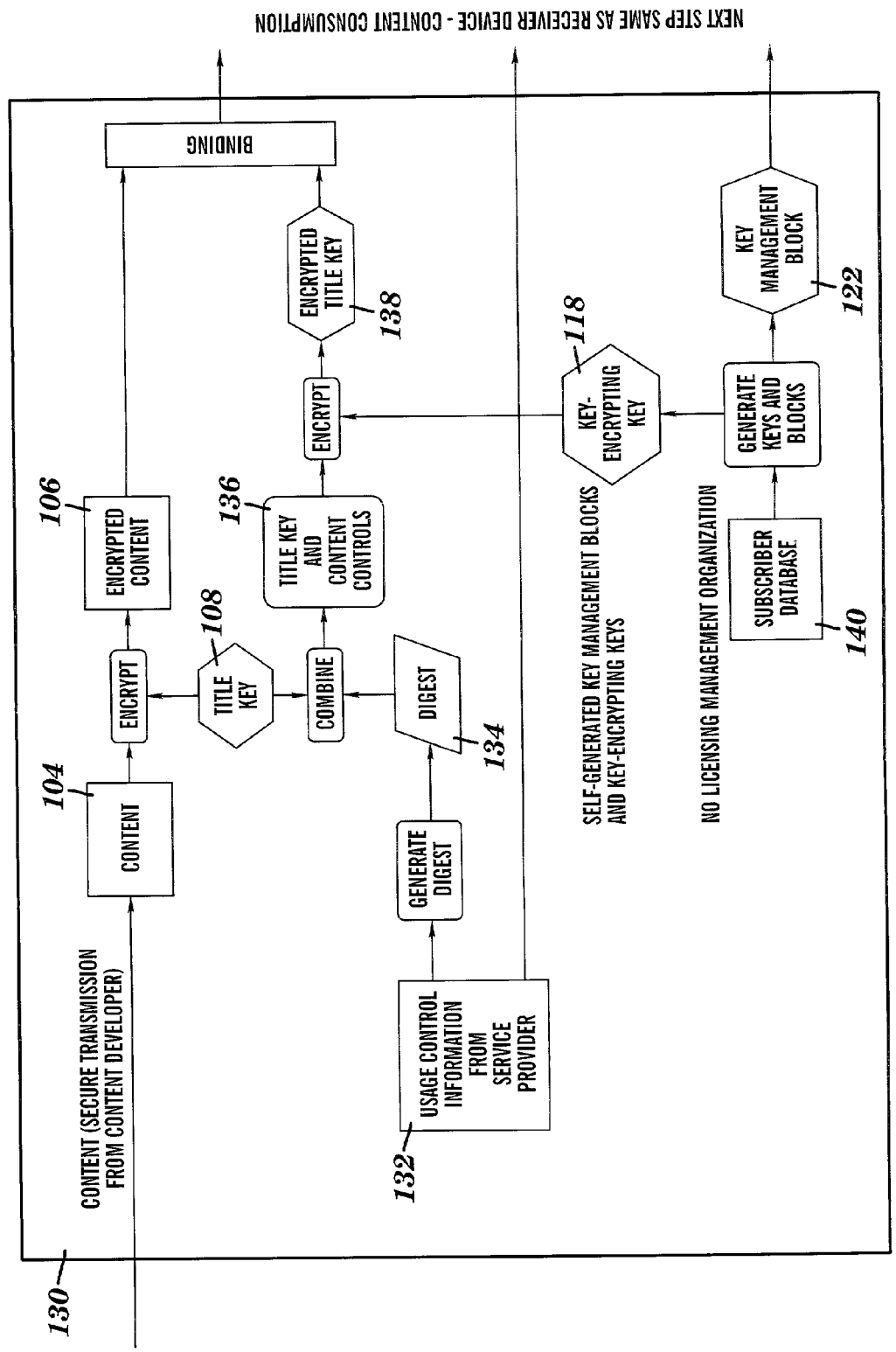
FIG. 8 depicts a flow diagram of an alternative means for a service provider to control subscriber access to content, according to the present invention.

Referring now to FIG. 8, an alternative means for service provider 130 to control subscriber access to content is shown. Specifically, service provider 130 will receive protected content 104 from content owner 124. Unlike FIG. 7, however, service provider 130 receives content 104 protected, but unencrypted (e.g., a secure transmission). Content 104 is then encrypted with title key 108 to yield encrypted content 106. Service provider content usage conditions 132 are then set forth and compressed into digest 134, which is combined with title key 108. The resulting combination 136 is encrypted with key encrypting key 118 to yield encrypted combination 138, and bound to encrypted content 106 for transmission. Unlike FIG. 7, key encrypting key 118 and KMB 122 are not determined by a license management organization. In contrast, key encrypting key 118 and KMB 122 are generated based on a subscriber database 140. Irrespective of this distinction, the present invention still provides the capability to receive protected content and modify content usage conditions. This alternative means can be implemented within a subscriber management system and/or a conditional access system.

Figure 9:
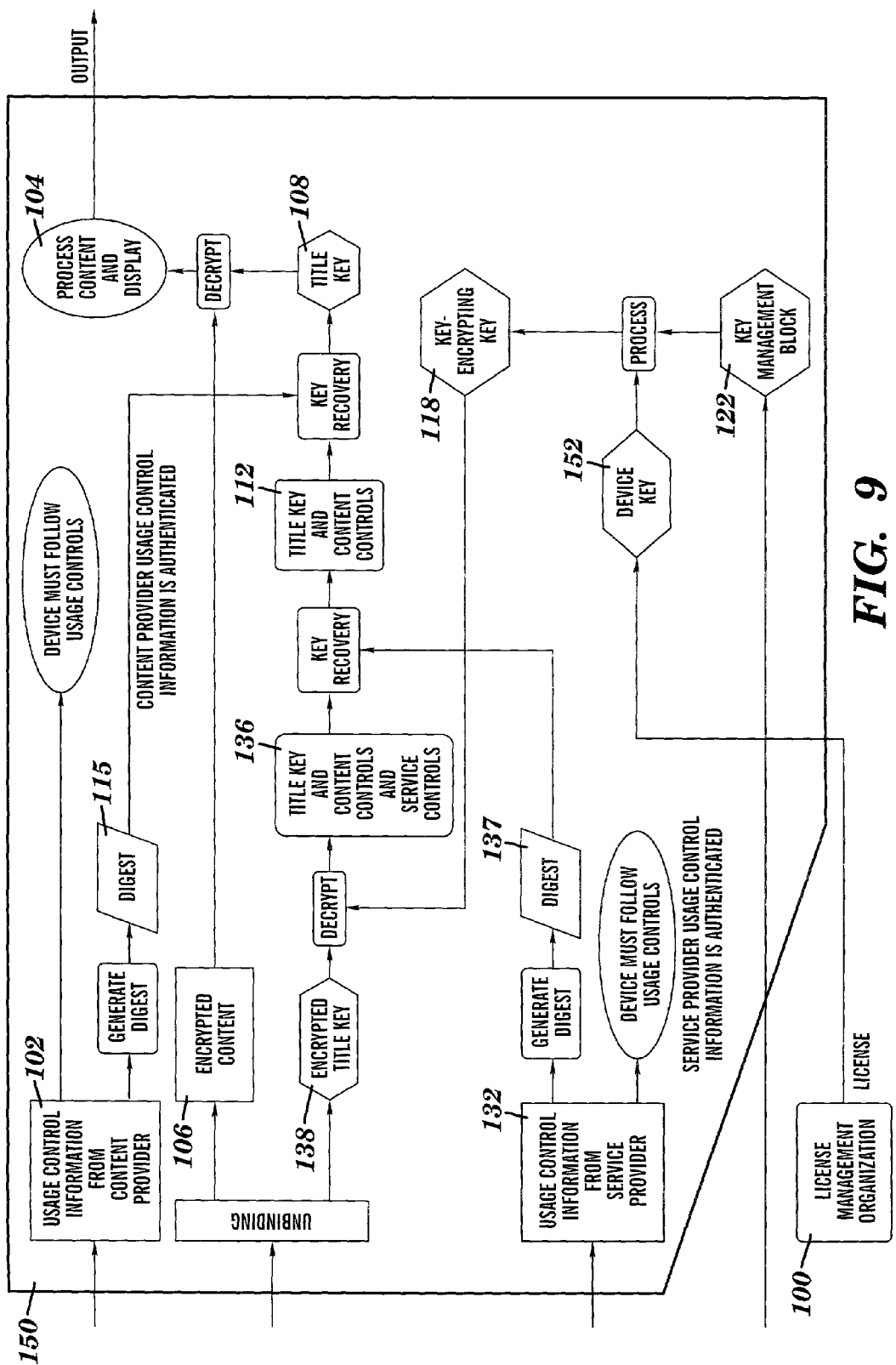
FIG. 9 depicts a flow diagram of a receiver receiving the transmission of FIG. 7 or 8 from the service provider.

Referring now to FIG. 9, receipt of the transmission of FIG. 7 or 8 by a receiver 150 is depicted. Receiver 150 is intended to be exemplary of any consumer device capable of receiving digital content. Such devices could include, among other things, a set-top box for receiving cable television signals, a DVD player, a television, a personal computer, etc. As depicted, receiver 150 will receive and separate encrypted content 106 from encrypted combination 138 (i.e., the MAC). Then, using key encrypting key 118, encrypted combination 138 will be decrypted to yield combination 136. Key encrypting key 118 is recovered by processing KMB 122 with device key 152. As described above in conjunction with FIG. 1, device key 152 is provided by license management organization 100 and allows receiver 150 to decrypt one of the encryptions of key encrypting key 118 contained in KMB 122. Moreover, as described above, KMB 122 revokes receivers deemed non-compliant in the sense that they cannot calculate the correct key encryption key. That is, if a receiver has been identified as a circumvention or a revoked device, its device keys will not allow it to calculate the correct key encryption key encrypted in KMB 122. Thus, any attempts by the non-compliant device to recover key encrypting key 118 from KMB 122 will be unsuccessful.

Once decrypted combination 136 is revealed, receiver will verify the integrity of and/or "separate out" service provider content usage conditions to recover title key 108. In the case of the former, verification can be performed as described above in conjunction with FIG. 7. Specifically, verification digest 137 based on service provider usage conditions is created and compared to service provider usage conditions as digested (134) in decrypted combination 136. In the case of the latter, receiver 132 will use digest 137 to remove service provider content usage conditions from decrypted combination 136 to yield combination 112. Once service provider content usage conditions have been removed, owner content usage conditions will be verified and/or removed in a similar manner. Specifically, using owner content usage conditions 102, digest 115 is created and is used to verify the integrity of and/or "separate out" owner content usage conditions as digested (110) in combination 112. Once all content usage conditions have been "separated out," title key 108 is recovered. Title key 108 allows encrypted content to be decrypted for display on a television, monitor or the like.

It should be appreciated that in addition to verifying and/or "separating out," receiver 150 must also follow all content usage conditions received in transmission. For example, if owner content usage conditions 102 prevented the copying of content 104, and service provider content usage conditions 132 prevented the re-broadcast thereof, receiver 150 will not be able to either copy or re-broadcast content 104. It should also be appreciated that although FIG. 9 depicts the separation of service provider content usage conditions 132 before owner content usage conditions 102, separation could actually occur in any order.

Figure 10:
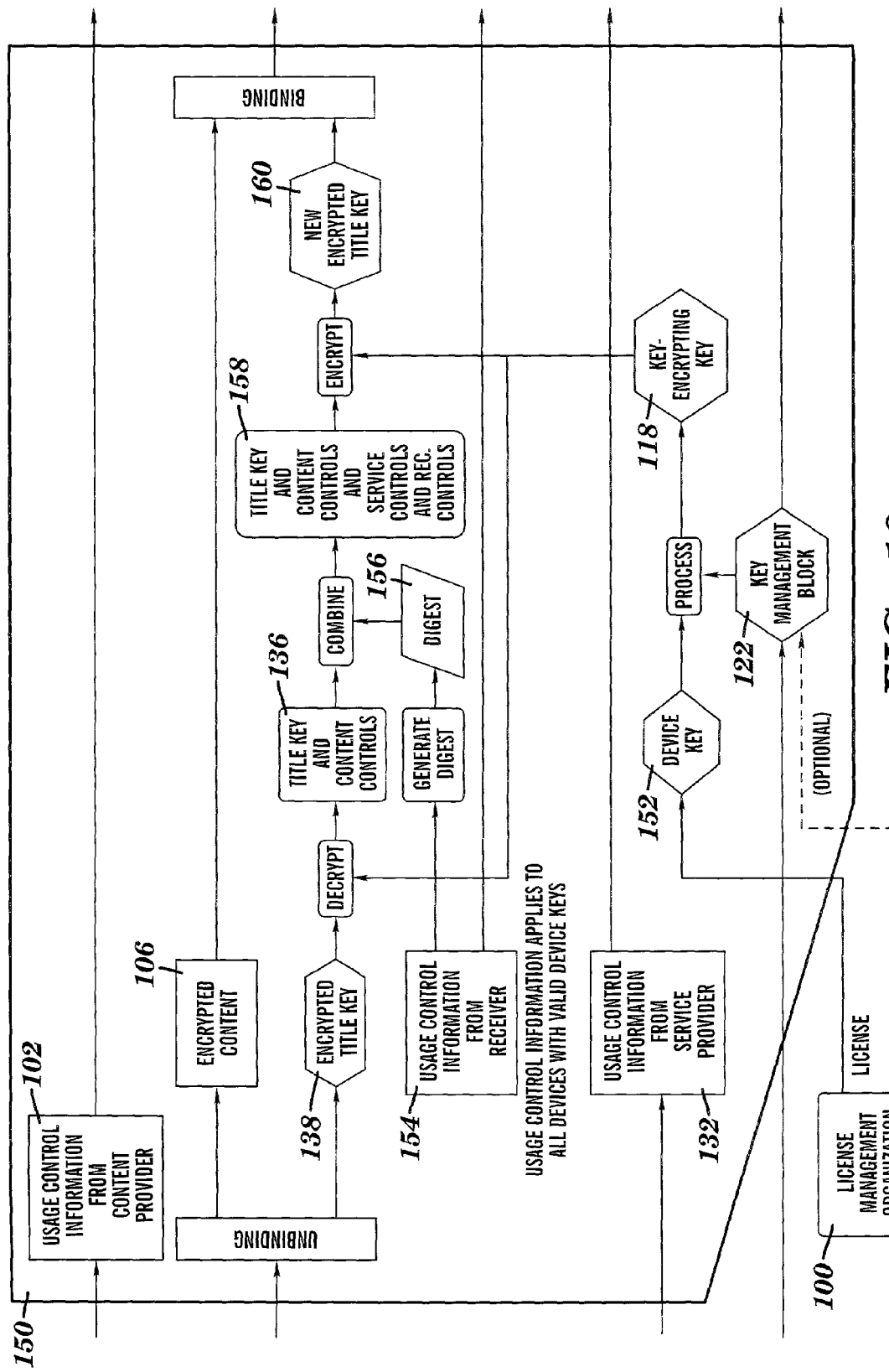
FIG. 10 depicts a flow diagram of a receiver receiving the transmission of FIG. 7 or 8 from the service provider, and modifying the content usage conditions therein.

FIG. 10 depicts the modification (e.g., editing or addition) of content usage conditions by receiver 150. As indicated above, receiver 150 can receive signals from content service provider 130 (e.g., where content is provided in a cable television signal) or directly from content owner 124 (e.g., where content is provided on a recordable medium). In either event, receiver 150 could have the capability to modify content usage conditions. FIG. 10 depicts the scenario of receiving signals from content service provider 130. Similar to FIG. 9, receiver 150 receives and separates encrypted content 106 from encrypted combination 138 (i.e., the MAC). Then, using key encrypting key 118 recovered from KMB 122 with device key 152, combination 138 is decrypted to yield unencrypted combination 136. To modify content usage conditions receiver 150 can either edit owner content usage conditions and/or service provider content usage conditions, or add receiver content usage conditions 154. In either event, the MAC will be re-calculated. That is, any edited content usage conditions or new receiver content usage conditions 154 will be compressed into a digest 156 and added to the title key and any existing (e.g., un-edited) content usage conditions to yield combination 158. Combination 158 will then be encrypted with key encrypting key 118 to yield encrypted combination 160 (i.e., the re-calculated MAC), which can be bound to encrypted content 106 and transmitted with owner content usage conditions 102, service provider content usage conditions 152, receiver content usage conditions 154 and KMB 122.

Figure 11:
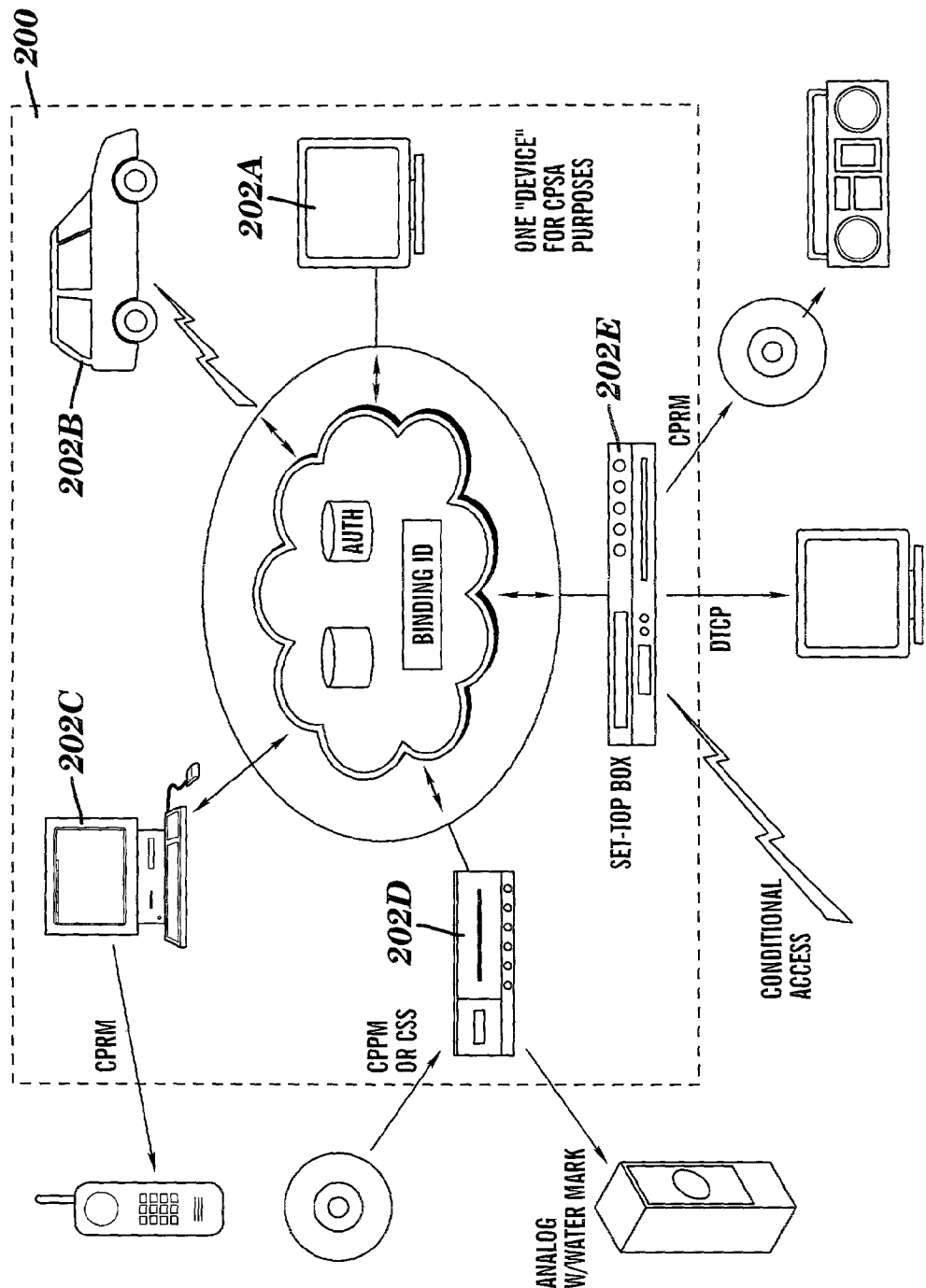
FIG. 11 depicts devices interconnected in a consumer home network.

One scenario in which receiver 150 could be provided with the capabilities of FIG. 10 is as part of a consumer home network implemented under the xCP protocol. As shown in FIG. 11, under the xCP protocol, multiple consumer devices 202 A-E are interconnected in a "cluster" that forms a consumer home network 200. All interconnected devices are permitted to freely share protected content. Under such an implementation, a user need only purchase one copy of a piece of content to be able to use it freely within his/her own network. Such sharing within the network is permitted irrespective of any content usage conditions placed on the content. To fully protect content introduced into a consumer home network, however, additional protections are required. Specifically, devices 202 A-E within the network must agree on three things: (1) a common KMB; (2) a common network identifier known as a binding identifier; and (3) a common knowledge of other devices on the network, referred to as an authorization table. Thus, encryption and decryption of content in network 200 is fairly more sophisticated than in general broadcast distribution discussed in FIGS. 1-10. Specifically, content is encrypted with a title key, which itself is encrypted with a binding key. Unlike the key encrypting key 118 of FIGS. 1-10 used to encrypt title key 108, the binding key is determined based on a combination of: (1) a media key, which is determined from KMB 122 similar to key encrypting key 118 of FIGS. 1-10; (2) the binding identifier; and (3) a hash of the authorization table.

Although content can be freely shared among devices 202 A-E each device in the network 200 must still transmit the content in an encrypted format. Thus, each device receiving the content must perform the decryption on its own. Specifically, each device must determine the media key from the KMB, then use the media key in conjunction with the binding identifier and the authorization table to recover the binding key. The binding key will the decrypt the title key (or a title key-content usage condition combination), which will be used to decrypt and implement the underlying content.

This system of encrypting content in a consumer home network helps prevent pirating of content by/to devices outside of the network because each network has its own unique binding key which is used to protect content. Specifically, if a user makes an unauthorized copy of content for a friend, and the user simply brings the copy to the friend's house and loads it on the friend's network, the content will not "play" because the friend's network uses a different binding key. Moreover, even if the user brings along his/her KMB and network's authorization table, the compliant devices in the friend's network will observe that they are not listed in the authorization table, and refuse to play the content. Thus, each piece of content can be tied to a particular binding key and thus, a particular network.

In general, a consumer can freely add compliant devices to his/her network 200 up to a predetermined amount. The process of adding a device to a consumer home network is as follows. A user connects a new xCP-enabled device to the network. The new device automatically generates a "who's there" message to determine which other xCP-enabled devices are in the network. Some of the existing devices on the network are authorizers and can authorize the new device. Also, some of the existing devices are servers meaning that they contain a copy of the network KMB and can share it with other devices. In many cases, authorizers and servers are the same devices. The new device will then request all authorizers to authorize it by sending a message to each authorizer. In this message, the device identifies itself based upon its type and signs the message with a message authentication code (MAC). In this case, the MAC is typically a combination of a hash/digest of the message and the media key, as encrypted with the binding key. By checking the MAC, the authorizers can determine whether the device is a compliant device, and whether or not the message has been modified by an "attacker" along the way. As indicated above, non-compliant devices are excluded from calculating the media key in the KMB. If any of the authorizers authorizes the new device, it becomes part of the network. Once authorized, the network binding identifier is transmitted to the new device, and the authorization table is updated. Specifically, under the present invention, the network binding identifier transmitted to the new device is encrypted with a peer key. The peer key is based on the media key, and is processed with the new device's internal device keys to reveal the binding identifier. Once the authorization table is updated, the binding key is updated and the title key is re-encrypted. Re-encryption of the underlying content is not necessary.

The present invention also provides for merging multiple device clusters that are created due to the order in which a user connected devices to the home network. Specifically, if a user attempts to connect multiple devices to a network, multiple network clusters could be created. For example, devices 202 A-B could have formed their own cluster within the overall network cluster of devices 202 A-E. To prevent confusion of the network, all clusters will be merged to form a single network cluster. To merge the clusters, a first device must observe that one cluster is a subset of another cluster. The device will then tentatively abandon the smaller cluster. In the event that both clusters are the same size, the device can arbitrarily select a cluster to abandon. Periodically, other devices in the cluster are doing the same thing. Accordingly, there is a slight chance that two devices will simultaneously abandon different clusters. In that case, the subset test will fail, and both devices will reset and the process starts again from the beginning. Because the devices are abandoning clusters at random times, eventually one cluster will be a proper subset of the other, and all devices will agree on which cluster is abandoned and which cluster survives.

On some occasions, a new device might have its own KMB. In such a case, the proposed KMB will be merged with the existing KMB, which would cause the binding key to change. There are several ways to merge KMBs, all of which are within the scope of this invention. The simplest is to concatenate the two KMBs, and have the media key be the XOR of the two media keys. However, there are other methods known in the art, for example, the 4C Entity's Specifications for Content Protection for Recordable Media teach a method, which is called the "Media Key Block extension."

Under the present invention, the proposed KMB is first authenticated using a MAC (which in this case is typically a combination of a hash/digest of the new KMB and the media key, as encrypted with the binding key). The existing device then determines whether or not a merging is necessary. Specifically, if the proposing device has not previously accepted the existing device's KMB, then a merging of the proposed KMB and the existing KMB is necessary. That is, the proposed KMB will only be accepted if it includes the existing KMB. Once accepted, the message that a device accepts a KMB is also authenticated with a MAC, so it cannot be forged by a circumvention device.

Figure 12:
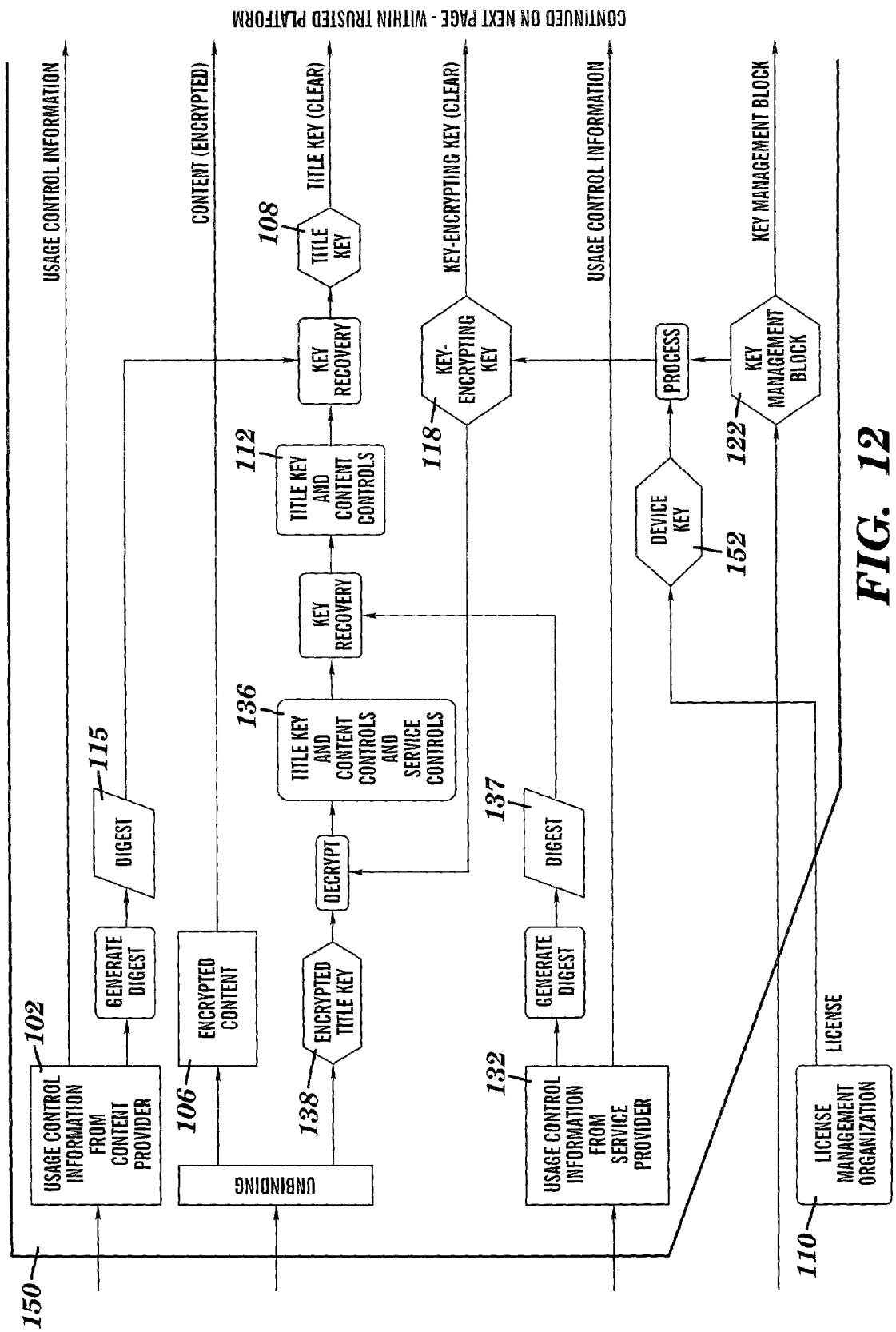
FIG. 12 depicts a flow diagram of a receiver receiving the transmission of FIG. 7 or 8 from the service provider for re-transmission within a consumer home network.
Figure 13:
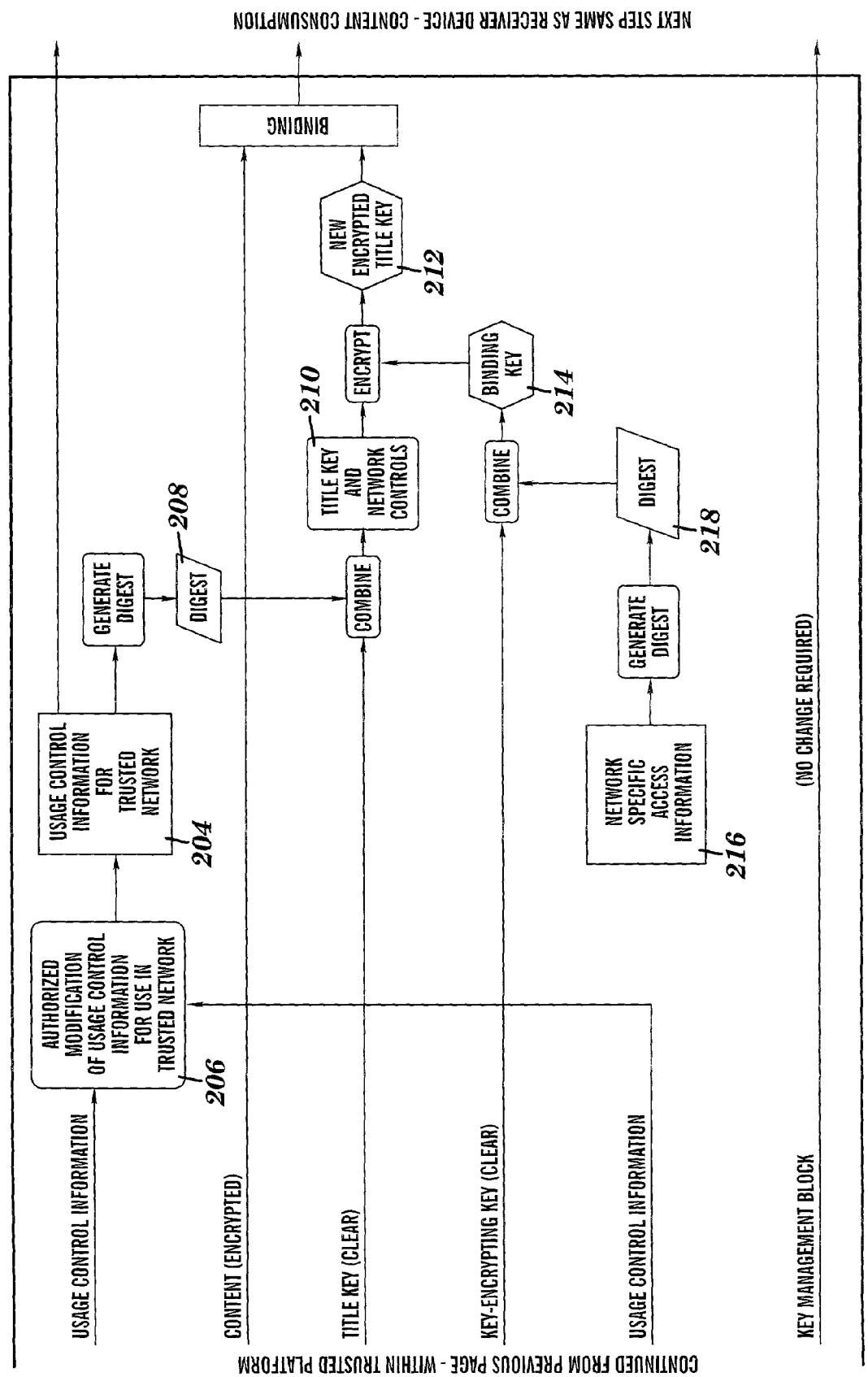
FIG. 13 depicts a flow diagram of the receiver of FIG. 12 modifying the content usage conditions.

Referring now to FIGS. 12 and 13, the modification of content usage conditions and re-transmission of content within a consumer home network 200 is shown. Specifically, referring first to FIG. 12, a transmission will be received and processed similarly to that shown and described in conjunction with FIG. 9. As depicted, receiver 150 (intended to be exemplary of any device 202 A-E on network 200) will receive and separate encrypted content 106 from encrypted combination 138. Then, using key encrypting key 118 as recovered using device key 152 and KMB 122, combination 138 will be decrypted. Once decrypted, digest 137 will be created to verify the integrity of and/or "separate out" service provider content usage conditions from decrypted combination 136. Similarly, digest 115 will be created to verify the integrity of and/or "separate out" owner content usage conditions. Once all content usage conditions have been verified and/or "separated out," title key is recovered 108.

At this point, receiver 150 can modify content usage conditions. As depicted in FIG. 13, authorized modifications 206 can include editing existing owner or service provider content usage conditions and/or adding new receiver content usage conditions. In either event, such modification information 206 is combined with existing owner and service provider content usage conditions 204 and compressed into a digest 208. The digest is then combined with title key 108 of FIG. 12 to yield a combination 210. The combination 210 is then encrypted with binding key 214 (i.e., to yield a re-calculated MAC). As discussed above, binding key is based on a media key, an authorization table, and a binding identifier. The authorization table and binding identifier are provided as network specific information 216, which is compressed into digest 218 and processed with the media key to arrive at binding key 124. Since the media key is determined based on device keys and KMB 122 (similar to key encrypting key 118), the media key is represented in FIG. 13 as key encrypting key 118 from FIG. 12. However, it should be appreciated that this for exemplary purposes only and need not be the case. Binding key is then used to encrypt combination 210, which is bound to encrypted content and transmitted to other devices in network 200 along with all content usage controls 204 and 206 and KMB 122. Other devices within network 200 receiving the transmission will decrypt and utilize content by first determining binding key 214 and then decrypting combination 212.

By encrypting the content with a title key that does not change, problems associated with devices of different functionality within network 200 are obviated. Specifically, network 200 could include a device such as a DVD player that cannot understand more complex content usage conditions intended for a personal computer or the like. By generating a MAC by combining a digest (e.g., a hash) of the content usage conditions with the title key, and then encrypting the combination with a binding key, it is not necessary for each device to understand the content usage conditions to protect the content. That is, the content is protected with the same title key. Moreover, since the title key remains the same, the content never has to be re-encrypted. Rather, any desired updating of security can be accomplished by changing re-encrypting the title key combined with the digest of the new usage conditions.

It should be understood that the concept of modifying content usage conditions at various points in distribution under the present invention is applicable to the distribution of content via: (1) the Internet to a computer device; (2) a recordable medium to a medium player; and/or (3) broadcast media to a television. The third scenario of broadcast media was commonly depicted herein for exemplary purposes only.

It should also be understood that the elements of FIGS. 1-13 used to receive/transmit transmissions, encrypt/decrypt data and/or keys, define and/or modify content usage conditions, add new devices, merge KMBs, merge clusters, and calculate keys are implemented as hardware, software or as a combination of hardware or software. As such any kind of computer/server system(s)—or other apparatus adapted for carrying out the methods described herein—is suited. A typical combination of hardware and software could be a general purpose (computer) system with a computer program that, when loaded and executed, carries out the methods described herein. Alternatively, a specific use (computer) system, containing specialized hardware for carrying out one or more of the functional tasks of the invention could be utilized. The present invention can also be embedded in a computer program product, which comprises all the features enabling the implementation of the methods described herein, and which—when loaded in a (computer) system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Figure 14:
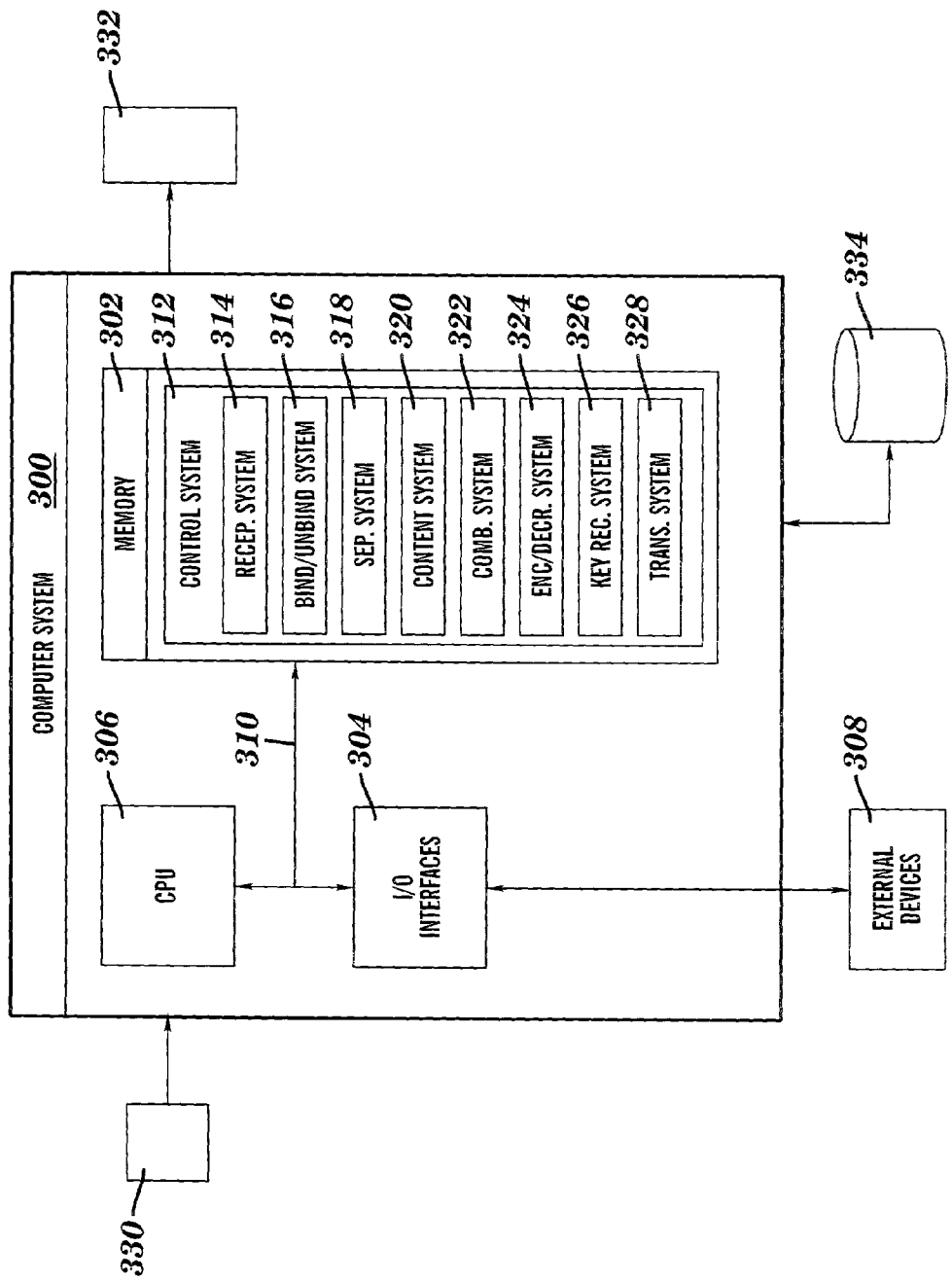
FIG. 14 depicts a computer system having a control system, according to the present invention.

Referring now to FIG. 14 an exemplary computerized implementation of the present invention is shown. As depicted, computer system 300 generally comprises memory 302, input/output (I/O) interfaces 304, a central processing unit (CPU) 306, external devices/resources 308, bus 310 and database 334. Memory 302 may comprise any known type of data storage and/or transmission media, including magnetic media, optical media, random access memory (RAM), read-only memory (ROM), a data cache, a data object, etc. Moreover, memory 302 may reside at a single physical location, comprising one or more types of data storage, or be distributed across a plurality of physical systems in various forms. CPU 306 may likewise comprise a single processing unit, or be distributed across one or more processing units in one or more locations, e.g., on a client and server.

I/O interfaces 304 may comprise any system for exchanging information from an external source. External devices 308 may comprise any known type of external device, including speakers, a CRT, LED screen, hand-held device, keyboard, mouse, voice recognition system, speech output system, printer, monitor, facsimile, pager, etc. Bus 310 provides a communication link between each of the components in the computer system 300 and likewise may comprise any known type of transmission link, including electrical, optical, wireless, etc. In addition, although not shown, additional components, such as cache memory, communication systems, system software, etc., may be incorporated into computer system 300.

Database 334 may provide storage for information necessary to carry out the present invention such as an authorization table, a binding identifier, a KMB, etc. As such, database 334 may include one or more storage devices, such as a magnetic disk drive or an optical disk drive. In another embodiment, database 334 includes data distributed across, for example, a local area network (LAN), wide area network (WAN) or a storage area network (SAN) (not shown). Database 334 may also be configured in such a way that one of ordinary skill in the art may interpret it to include one or more storage devices.

It should be understood that computer system 300 is intended to be representative of any recipient (e.g., content service provider 130 or receiver 150) capable of receiving protected content and modifying content usage conditions. As shown, computer system 300 further includes control system 312 (shown as a program product) that performs the various functions described above. Control system 312 includes reception system 314, binding/unbinding system 316, separation system 318, content usage control system 320, combination system 322, encryption/decryption system 324, key recovery system 326 and transmission system 328. In addition, the present invention could also include identifier system 336, KMB system 338 and cluster system 340, as will be further described in conjunction with FIGS. 15-17.

Reception system 314 receives all information in a transmission from source 330 (source can be content owner, a content service provider or even a receiver/device in a consumer home network). Such information includes protected content, content usage conditions, a KMB, and encrypted combination of content usage conditions and a title key (or some other MAC). Binding/unbinding system 316 will separate the encrypted combination from the encrypted content. Once separated, encryption/decryption system 324 will decrypt the combination. That is, the MAC will be processed. As discussed above, decryption of the combination occurs by key recovery system 326 first recovering the key encryption key or the binding key (based on the media key, the authorization table and the binding identifier as recovered form database 334). Once decrypted, content usage conditions can be modified (e.g., edited or added) via content usage control system 320 and the MAC re-calculated. That is, any added conditions will then be compressed into a digest by content usage control system 320 and combined with the decrypted combination of the title key and existing content usage conditions via combination system 322. Once added, the resulting new combination can be re-encrypted via encryption/decryption system 324 (at which point the re-calculation of the MAC is complete), and re-bound to the encrypted content via binding/unbinding system 316. In the event existing content usage conditions are to be verified and/or "separated out" from the decrypted combination of content usage conditions and the title key, separation system 318 will re-create any digests from received information and facilitate the operations. Once the re-encrypted combination (i.e., the re-calculated MAC) is rebound to the encrypted content, the resulting binding can then be transmitted to another recipient 332.

Figure 15:
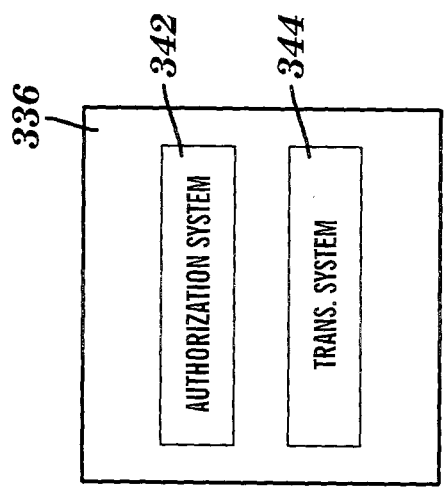
FIG. 15 depicts an identifier system according to the present invention.

Referring now to FIG. 15, identifier system 336 is shown in detail. Identifier system 336 encrypts a binding identifier during authorization of a new device in a consumer home network. Such encryption helps maintain the security of the network. As depicted, identifier system 336 includes authorization system 342 and transmission system 344. Authorization system 342 coordinates the authorization of a new device to join the consumer home network. As indicated above, this includes an authorizing device (already on the network) approving the new device based on the KMB encrypted with a media key. Once authorized, the binding identifier is encrypted and transmitted to the new device via transmission system 344. Specifically, the binding identifier is encrypted with a peer key. The peer key is based on a media key that is determined by processing a KMB. Thus, only compliant devices should be able to decrypt the binding identifier.

Figure 16:
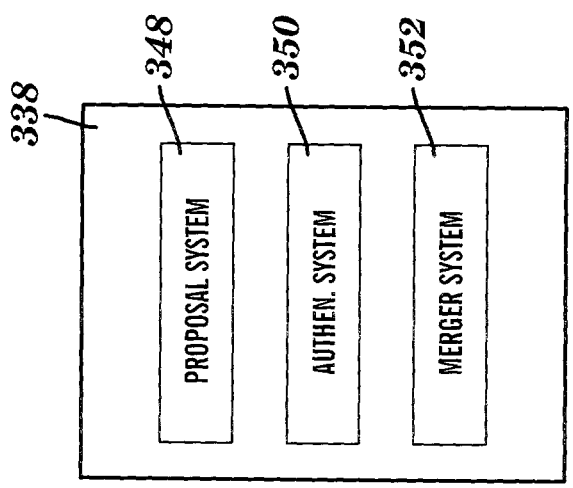
FIG. 16 depicts a KMB system according to the present invention.

Referring now to FIG. 16, KMB system 338 is shown in detail. KMB system 338 facilitates the merger of a proposed KMB with an existing KMB, which is typically useful in a consumer home network operating under the xCP cluster protocol. To this extent, KMB system 228 includes proposal system 348, authentication system 350 and merger system 352. To merge two KMBs, a KMB will be proposed via proposal system 348. The proposed KMB will then be authenticated via authentication system 350. Authentication is generally based on a key. Specifically, authentication is based on a MAC code that comprises a combination of a digest of the proposed KMB and a media key, as encrypted with a binding key. The authentication system also includes logic to verify that the proposed KMB is a merge of (i.e., includes) the existing KMB, if that is required. Once authenticated, the proposed KMB will be merged with the existing KMB via merger system 352. The merger of two KMBs prevents devices in a consumer home network from having conflicting KMB information.

Figure 17:
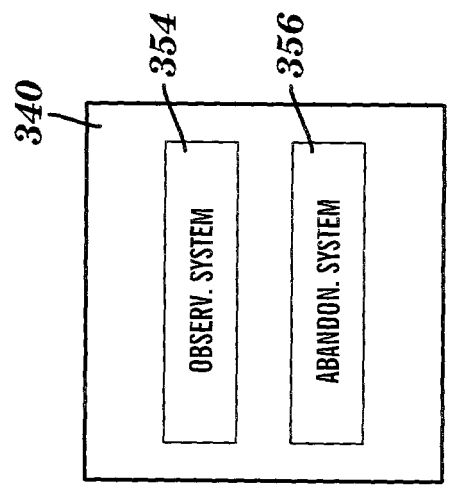
FIG. 17 depicts a cluster system according to the present invention.

Referring now to FIG. 17, cluster system 340 is shown in detail. Cluster system 340 facilitates the merging of two device clusters within a consumer home network. As shown, cluster system 340 includes observation system 354 and abandonment system 356. In order for clusters to be merged, a device must first observe that a first device cluster is a subset of a second device cluster. Such observation capability is generally provided by observation system 354. Once a subset has been observed, the device will abandon the smaller of the two clusters via abandonment system 356. In the event that the two clusters are the same size, the device can randomly select a device cluster to abandon. In general, multiple device clusters can occur if devices are interconnected in a certain order by a user.

It should be understood that the various systems depicted in FIGS. 14-17 are intended to be exemplary only. To this extent, any entity/device such as content service provider 130, receiver 150 and/or network devices 202 A-E could include some or all of these systems.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A method for modifying content usage conditions during content distribution, comprising the steps of:
   receiving, on a computer device at a recipient, a data delivery that is delivered using broadcast encryption and has: protected content, content usage conditions, a message authentication code (MAC) and a key management block (KMB), the data delivery being distributed by a source;
   processing, on the computer device, the MAC with a key derived from the KMB to decrypt the content usage conditions without decrypting the protected content;
   creating, on the computer device, by the recipient, new content usage conditions in addition to the content usage conditions during distribution of the received protected content; and
   forming an updated data delivery having the new content usage conditions encrypted along with the content usage conditions in addition to all contents of the data delivery.

2. The method of claim 1, wherein the MAC comprises an encrypted combination of an existing digest of the content usage conditions and a title key.

3. The method of claim 2, wherein the processing step comprises the steps of:
   decrypting the encrypted combination with a key encrypting key;
   generating a verification digest of the content usage conditions; and
   comparing the verification digest to the existing digest.

4. The method of claim 1, wherein the key comprises a key encrypting key that is derived from the KMB.

5. The method of claim 1, wherein the key is a title key that is recovered with a key encrypting key, and wherein the key encrypting key is derived from the KMB.

6. The method of claim 1, further comprising the step of re-calculating the MAC based on the new content usage conditions.

7. The method of claim 1, wherein the content usage conditions are modified by a content service provider.

8. The method of claim 1, wherein the content usage conditions are modified by a receiver.

9. A method for modifying content usage conditions during broadcast distribution, comprising the steps of:
   receiving, on a computer device at a recipient, a data delivery that is delivered using broadcast encryption and has: encrypted content, content usage conditions, an encrypted combination of the content usage conditions and a title key, and a key management block (KMB), the data delivery being distributed by a source;
   determining a key encrypting key based on the KMB;
   decrypting, on the computer device, the encrypted combination using the key encrypting key to obtain the content usage conditions without decrypting the protected content;
   creating, on the computer device, by the recipient, new content usage conditions in addition to the content usage conditions during distribution of the received encrypted content; and
   forming an updated data delivery having the new content usage conditions encrypted along with the content usage conditions in addition to all contents of the data delivery.

10. The method of claim 9, further comprising the steps of:
    re-encrypting the decrypted combination; and
    transmitting the encrypted content, the re-encrypted combination, the content usage conditions, and the KMB to a receiver.

11. The method of claim 10, further comprising the steps of:
    the receiver receiving the encrypted content, the content usage conditions, the re-encrypted combination, and the KMB;
    the receiver determining the key encrypting key based on the KMB;
    the receiver decrypting the re-encrypted combination using the key encrypting key; and
    the receiver adding the new usage conditions.

12. The method of claim 9, wherein the encrypted content, the content usage conditions, the encrypted combination, and the KMB are transmitted in a single data delivery.

13. The method of claim 9, wherein the encrypted content, the content usage conditions, the encrypted combination, and the KMB are received by a content service provider from a content owner.

14. The method of claim 9, wherein the encrypted content, the content usage conditions, the encrypted combination, and the KMB are received by a receiver from a content service provider.

15. The method of claim 9, wherein the encrypted content, the content usage conditions, the encrypted combination, and the KMB are received by a receiver from a content owner.

16. A system for modifying content usage conditions during content distribution, comprising:
    a system for receiving, at a recipient, a data delivery that is delivered using broadcast encryption and has: encrypted content, content usage conditions, a message authentication code (MAC), and a key management block (KMB), the data delivery being distributed from a content source;

a system for determining a key encrypting key based on the KMB;

a system for processing the MAC using the key encrypting key to decrypt the content usage conditions without decrypting the protected content;

a system for creating, by the recipient, new content usage conditions in addition to the content usage conditions during distribution of the received encrypted content; and forming an updated data delivery having the new content usage conditions encrypted along with the content usage conditions in addition to all contents of the data delivery.

17. The system of claim 16, further comprising:
a system for re-calculating the MAC; and
a system for transmitting the re-encrypted combination, the re-calculated MAC, the content usage conditions, and the KMB to a receiver.

18. The system of claim 16, wherein the encrypted content, the content usage conditions, the MAC, and the KMB are received in a single data delivery.

19. The system of claim 16, wherein the content source is selected from the group consisting of a content owner, a content service provider and a receiver.

20. A program product stored on a computer readable storage device for modifying content usage conditions during content distribution, which when executed, comprises:

program code for receiving, at a recipient, a data delivery that is delivered using broadcast encryption and has: encrypted content, content usage conditions, an encrypted combination of the content usage conditions and a title key, and a key management block (KMB), the data delivery being distributed from a content source;

program code for determining a key encrypting key based on the KMB;

program code for decrypting the encrypted combination using the key encrypting key to obtain the content usage conditions without decrypting the protected content;

program code for creating, by the recipient, new content usage conditions in addition to the content usage conditions during distribution of the received encrypted content; and forming an updated data delivery having the new content usage conditions encrypted along with the content usage conditions in addition to all contents of the data delivery.

21. The program product of claim 20, further comprising:
program code for re-encrypting the decrypted combination; and
program code for transmitting the re-encrypted combination, the encrypted content, the content usage conditions, and the KMB to a receiver.

22. The program product of claim 20, wherein the encrypted content, the content usage conditions, the encrypted combination, and the KMB are received in a single data delivery.

23. The program product of claim 20, wherein the content source is selected from the group consisting of a content owner, a content service provider and a receiver.

24. A local network of devices for exchanging encrypted content, comprising:
a network-accessible hardware storage including:
a key management block (KMB);
a device authorization table, wherein content is encrypted with a key derived from the KMB and the device authorization table; and
a message authentication code (MAC) that includes a combination of usage conditions and a title key that are encrypted with a key encrypting key, wherein the MAC is decrypted and re-encrypted independently of the content adding new usage conditions to the content usage conditions,
wherein the content is included in a data delivery that delivers the encrypted content using broadcast encryption along with both content usage conditions that are newly created during distribution of the received encrypted content and content usage conditions received from an outside content source.

* * * * *